United States Patent [19]
Wakabayashi et al.

[11] 4,360,093
[45] Nov. 23, 1982

[54] ONE-WAY CLUTCH

[75] Inventors: Shozo Wakabayashi; Kinzo Narita, both of Daito, Japan

[73] Assignee: Tsubakimoto-Morse Co., Ltd., Osaka, Japan

[21] Appl. No.: 198,420

[22] Filed: Oct. 20, 1980

[30] Foreign Application Priority Data

Oct. 29, 1979 [JP] Japan .................................. 54-138726
Apr. 7, 1980 [JP] Japan .................................. 55-044566

[51] Int. Cl.³ .......................................... F16D 41/07
[52] U.S. Cl. .................................. 192/41 A; 192/45.1
[58] Field of Search ........................... 192/41 A, 45.1; 188/82.8

[56] References Cited

U.S. PATENT DOCUMENTS

| 2,737,275 | 3/1956 | Szady | 192/45.1 |
| 2,748,912 | 6/1956 | Banker | 192/45.1 |
| 2,763,354 | 9/1956 | Szady | 192/45.1 |
| 2,900,057 | 8/1959 | Schneider et al. | 192/45.1 |
| 2,902,126 | 9/1959 | Winchell | 192/45.1 |
| 3,907,083 | 9/1975 | Nieder | 192/45.1 X |
| 4,252,221 | 2/1981 | Lanzerath et al. | 192/41 A |

FOREIGN PATENT DOCUMENTS 1353194  5/1974  United Kingdom .............. 192/41 A Primary Examiner—Rodney H. Bonck
Attorney, Agent, or Firm—Blanchard, Flynn, Thiel, Boutell & Tanis

[57] ABSTRACT

A one-way clutch wherein a plurality of sprags disposed in an annular array are positioned within an annular space between concentric inner and outer rings. Each sprag has a groove formed therein substantially midway between the ends thereof, which groove opens outwardly of the sprag in a direction which extends radially relative to the inner and outer rings. A garter spring is fitted within the grooves defined by the plurality of sprags. An annular retainer is also disposed within the annular space for holding and positionally confining the sprags. The annular retainer has axially extending parts which are circularly joined together, whereby the axially extending parts positionally hold the sprags.

2 Claims, 24 Drawing Figures

4,360,093

ONE-WAY CLUTCH

FIELD OF THE INVENTION

This invention relates to a one-way clutch having an annular garter spring and a plurality of sprags inserted between outer and inner rings.

BACKGROUND OF THE INVENTION

An example of a conventional one-way clutch, as shown in FIGS. 1 and 2, uses a plurality of sprags S inserted, one in contact with another, between concentric outer and inner rings 1 and 2, respectively, one of which rotatably drives the other. An annular garter spring 5 is fitted in a groove 4 provided on each side of the sprag. An annular side plate 6 is disposed on each side of the sprag. A stopper ring 20, fitted in an annular groove formed in the internal surface of the outer ring 1, is provided on the outside of each side plate 6.

Another example of a conventional one-way clutch, as shown in FIGS. 3 and 4, uses a plurality of sprags S' inserted at intervals between the outer ring 1 and the inner ring 2. An annular garter spring 5 is fitted in each edge groove 4. A retainer 8, made of steel sheet punched with a sprag inserting hole 7, is used to keep the sprags spaced at given intervals.

The former type, shown in FIGS. 1 and 2, is assembled by inserting the individual sprags S one by one. This assembling work is not only laborious and inefficient, but is also likely to cause misfitting. The adjacent sprags interfere with each other to prevent smooth motion, with the points of contact moving in opposite directions as indicated by the arrows. Governed by the circumferential length of the outer and inner rings, the number of sprags cannot be decreased according to the required torque. Provision of the groove 4 to insert the garter spring 5 on each side of the sprag reduces the area of contact between the side of the sprag and the annular side plate 6. Consequently, if the sprag gives a localized axial push to the annular side plate 6, localized abrasive wear is likely to occur. Especially if the annular side plate 6 warps outward, the localized abrasive wear increases, greatly preventing the smooth motion of the sprags.

In the latter clutch, shown in FIGS. 3 and 4, the sprags S' are spaced away from each other by means of the retainer 8, so that the space between the adjacent sprags is not effectively used and the number of sprags insertable between the rings is limited, thereby limiting the ability for torque transfer. The revolving sprag sometimes interferes with, and thereby damages, the retainer 8. Owing to the inertia of circumferential motion, etc., the retainer 8 sometimes prevents the sprag from revolving, thereby making it impossible to engage or disengage the clutch. Because of the need to maintain high strength, the retainer 8 is usually made by blanking relatively heavy steel sheet. This, however, involves low material-to-product yield and high production cost. Besides, the increased retainer weight increases the inertia of motion, producing adverse effect on clutch performance. Blanking thinner steel sheet develops burrs which prevent the sprag from moving smoothly along and around the axis, and cause the sprag inserting hole 7 to wear easily.

This invention eliminates the aforementioned shortcomings of conventional one-way clutches.

In the improved one-way clutch of the present invention, a plurality of sprags disposed in an annular array are positioned within an annular space between concentric inner and outer rings. Each sprag has a groove formed therein substantially midway between the ends thereof, which groove opens outwardly of the sprag in a direction which extends radially relative to the inner and outer rings, the groove being effectively defined by a plane which is substantially perpendicular to the rotational axis of the clutch. A garter spring is fitted within the grooves defined by the plurality of sprags. An annular retainer is also disposed within the annular spece for holding and positionally confining the sprags. The annular retainer has axially extending parts which are circularly joined together, whereby the axially extending parts positionally hold the sprags.

In a preferred embodiment of the invention, the clutch has the retainer positioned directly adjacent the inner ring so that the surrounding garter spring urges the sprags into engagement with the axially extending parts of the retainer, whereby the retainer, sprags and garter spring can be fully assembled as a unit prior to insertion of same between the inner and outer rings.

Other objects and purposes of the invention will be apparent from the following detailed description.

DETAILED DESCRIPTION

Figure 1:
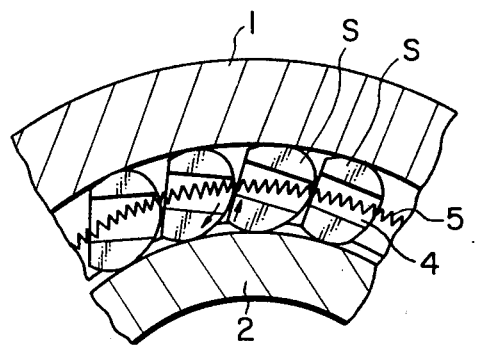
FIGS. 1 and 3 are fragmentary cross-sectional front views of the principal parts of two known clutches.
Figure 2:
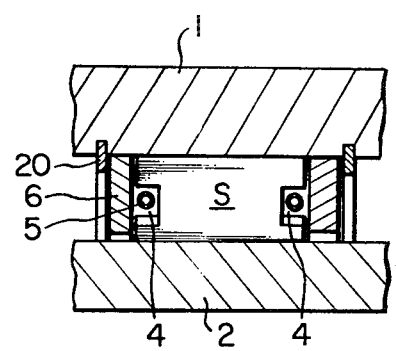
FIGS. 2 and 4 are cross-sectional side elevational views of FIGS. 1 and 3, respectively.
Figure 3:
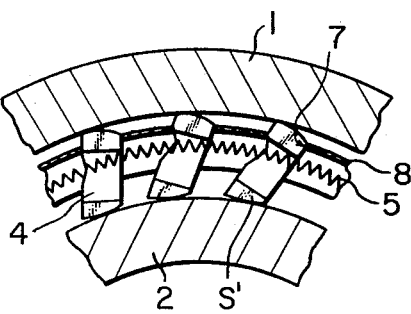
Figure 4:
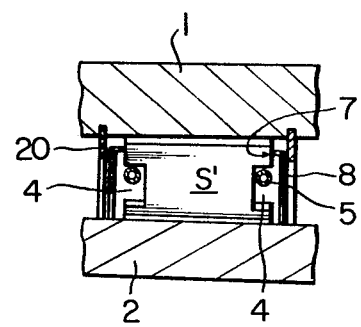
Figure 5:
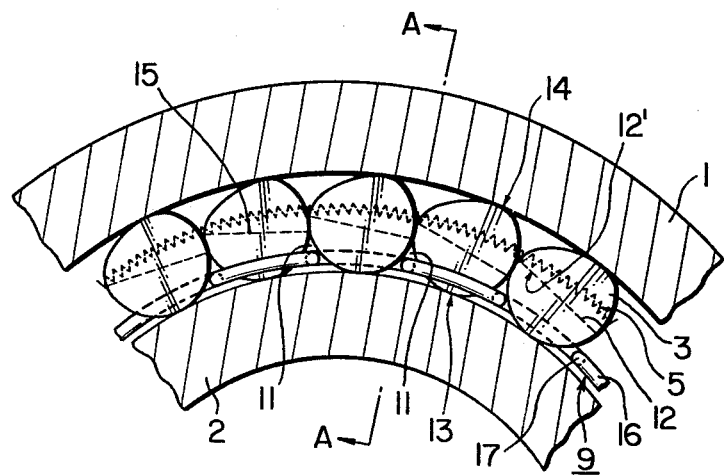
FIG. 5 is a cross-sectional front view showing the principal part of an embodiment of the invention, in which sprags are inserted one in contact with another.
Figure 6:
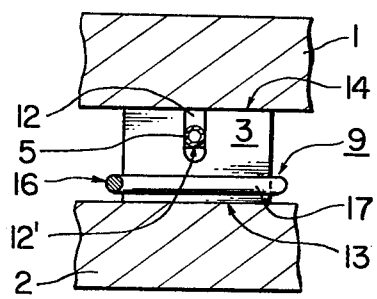
FIG. 6 is a cross-sectional view taken along the line A—A of FIG. 5.
Figure 9:
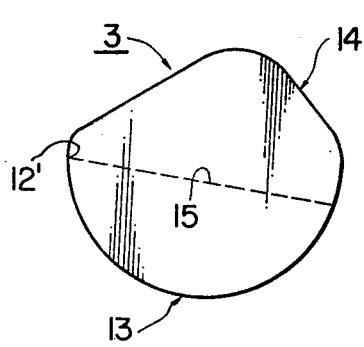
FIG. 9 is a front view of a sprag.
Figure 10:
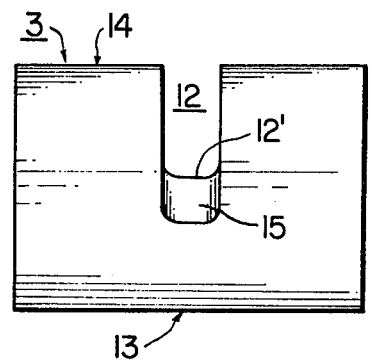
FIG. 10 is a side elevation of the sprag shown in FIG. 9.
Figure 11:
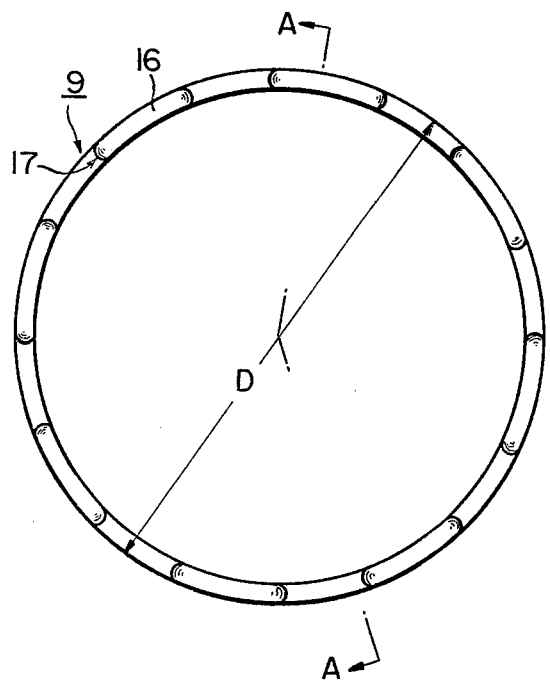
FIG. 11 is a front view of a retainer.
Figure 12:
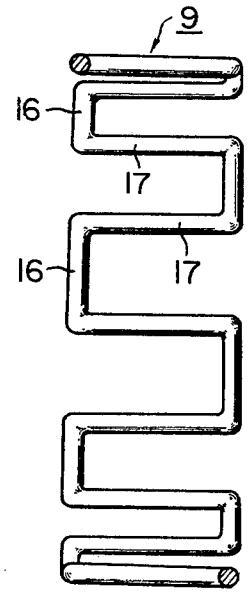
FIG. 12 is a cross-sectional view taken along the line A—A of FIG. 11.
Figure 13:
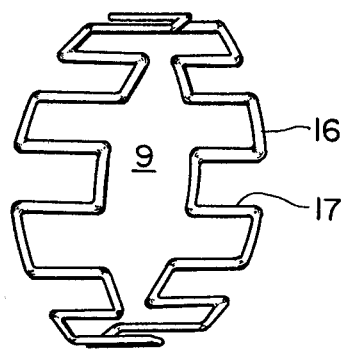
FIG. 13 is a perspective view of the retainer.
Figure 18:
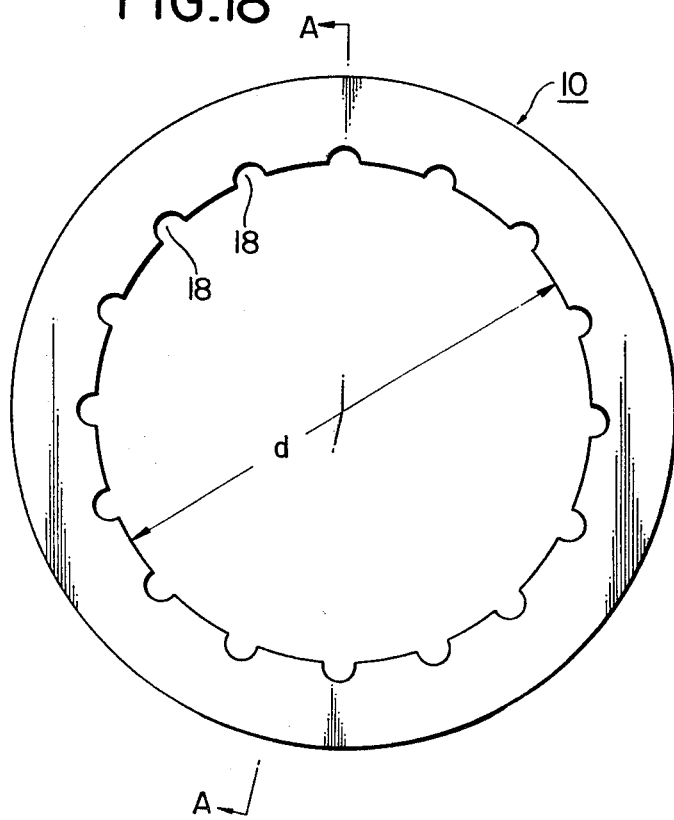
FIG. 18 is a front view of an annular side plate.
Figure 19:
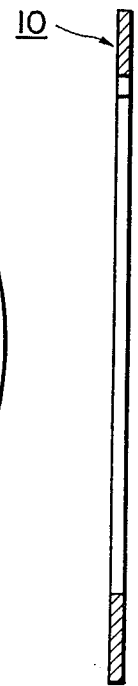
FIG. 19 is a cross-sectional view taken along the line A—A of FIG. 18.

In the embodiment of the invention illustrated in FIGS. 5 and 6, a plurality of sprags 3 are inserted, one in contact with another, between an outer ring 1 and an inner ring 2. A groove 12 to accommodate a garter spring 5 is formed across the middle of the sprag. The groove 12 has a bottom 15 that is inclined so that only one end 12' thereof comes in contact with the garter spring 5 when the sprag is placed between the inner and outer rings. Urged by the garter spring 5, accordingly, the one end 12' brings the internal surface 13 of the sprag 3 into contact with the external surface of the inner ring and the external surface 14 thereof with the internal surface of the outer ring. The internal surface 13 facing the inner ring is circularly shaped and the external surface 14 facing the outer ring is shaped as an asymmetrical cam surface, as shown in FIG. 9, so that part of the peripheral surface of one sprag can be in constant contact with that of another. A retainer 9 comprises, as shown in FIGS. 11 to 13, an elastic wire rod having a circular cross-section, which is bent alternately to form a circumferentially extending part 16 and an axially extending part 17, with both ends thereof joined together to form an endless ring as shown in FIG. 13. The retainer 9 is placed slidably in contact with the internal surface of the sprag by loosely fitting the axially extending part 17 in a deltaic or triangular space 11 formed between the peripheral surfaces of the sprags 3 and the inner ring 2.

In assembling a one-way clutch thus composed, the sprag 3 is first inserted between the adjacent axially extending members 17 of the retainer 9, with the groove 12 to support the garter spring 5 directed outward. The garter spring 5 is fitted in the groove 12 in the sprag 3. Then the sprags 3, together with the garter spring 5 and retainer 9 between which they are placed, make up an integral assembly. This assembly of the sprags 3, garter spring 5 and retainer 9 is inserted between the outer ring 1 and the inner ring 2. Then, as shown in FIG. 5, the garter spring 5 urges one end 12' of the groove 12 of the sprag 3, bringing the internal surface 13 of the sprag 3 in contact with the external surface of the inner ring 2 and the external surface 14 thereof with the internal surface of the outer ring 1. At the same time, the axially extending part 17 of the retainer loosely fits in the deltaic space 11 formed between the peripheral surfaces of the sprags and the inner ring. The sprags 3, garter spring 5, and the retainer 9 can be removed en bloc from between the outer ring 1 and inner ring 2. This is because the sprag 3 is restrained radially between the garter spring 5 and the axially extending part 17 of the retainer 9, and axially between the garter spring 5 and the circumferentially extending part 16 of the retainer 9.

Figure 14:
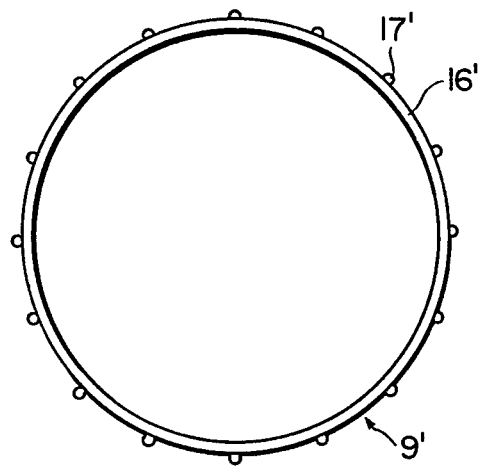
FIG. 14 is a front view of a welded retainer.
Figure 15:
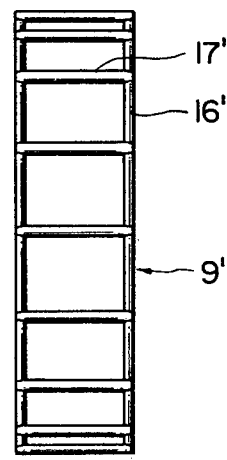
FIG. 15 is a side elevation of the retainer shown in FIG. 14.
Figure 16:
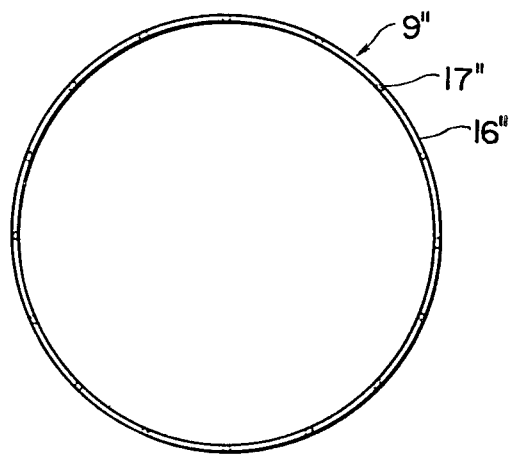
FIG. 16 is a front view of a blanked retainer.
Figure 17:
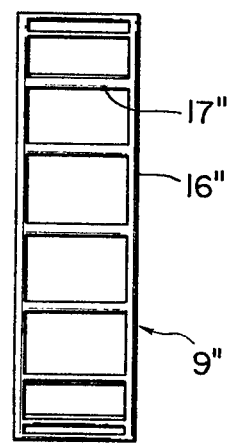
FIG. 17 is a side elevation of the retainer shown in FIG. 16.

FIGS. 14 and 15 show another embodiment of a retainer 9' which comprises axially extending members 17' welded at regular intervals to paired circular members or rings 16' consisting of two annular wires disposed parallel to each other. FIGS. 16 and 17 show a third embodiment of a retainer 9" which comprises a ladder-shaped steel sheet blank formed into an annular ring, with both ends thereof welded together. These latter described retainers function in the same manner as retainer 9 described above.

This embodiment which is composed as described above produces the following advantageous results:

Because the sprags 3 are inserted between the outer ring 1 and the inner ring 2 so as to circumferentially contact one another, the total cross-sectional area of the sprags is maximized to increase the torque transfer ability of the clutch. The inserting of the sprags 3 en bloc, together with the garter spring 5 and retainer 9, 9' or 9", between the outer ring 1 and inner ring 2 facilitates the assembly and disassembly of the clutch. Because, after assembly, the retainer 9, 9' or 9" rests loosely in the deltaic spaces 11 between the sprags 3 and the outer ring 1 or inner ring 2, no interference occurs between the sprags 3 and the retainer, causing no damage to the retainer during transmission. The reduced weight of the retainer reduces the inertia in the revolving direction, whereby the retainer does not prevent the revolution of the sprag 3. If the retainer is made of round wire rod, contact thereof with the sprag 3 is made between curved surfaces, thus permitting the sprag 3 to revolve smoothly. This, in turn, assures smooth operation of the clutch. As mentioned before, the retainer is assembled and disassembled, easily and rapidly, integrally with the sprag 3 and so on. When placed in position, the retainer rests loosely in the deltaic space 11. This permits making the retainer by fabricating steel wire (retainer 9 or 9') or blanking steel sheet (retainer 9"), instead of conventional deep drawing or other heavy working. The result is a simplified manufacturing process and lowered production cost of not only the retainer itself but also the entire clutch. The use of steel wire for the manufacture of the retainer offers greater yields and, therefore, permits producing still lower-priced clutches.

Figure 7:
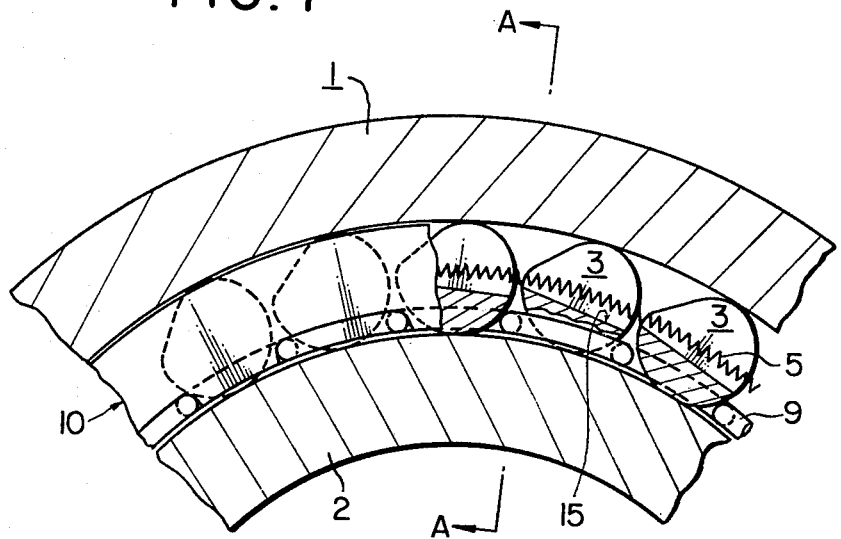
FIG. 7 is a cross-sectional front view showing the principal part of another embodiment.
Figure 8:
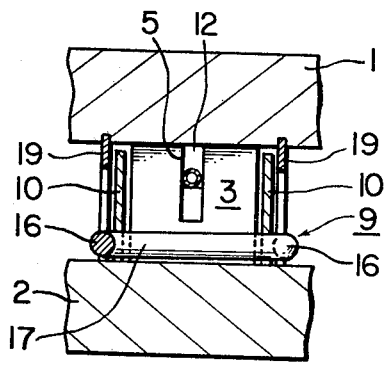
FIG. 8 is a cross-sectional view taken along the line A—A of FIG. 7.

FIGS. 7 and 8 illustrate an embodiment which differs from FIGS. 5 and 6 in that an annular side plate 10 is provided on both sides of the sprag 3, within both sides of the retainer. The retainer used here is alternately U-shaped in opposite directions, such as the retainer 9 shown in FIGS. 11 to 13.

As shown in FIGS. 7 and 8, and FIGS. 18 and 19, the annular side plate 10 has an outside diameter smaller than the inside diameter of the outer ring 1 and an inside diameter d larger than the outside diameter of the inner ring 2. Regularly spaced recesses 18 are provided along the internal boundary thereof, and one end of the axially extending part 17 of the retainer 9 is fitted in the recess 18. The outside diameter D of the retainer 9 is larger than the inside diameter d of the annular side plate 10. But the circumferentially extending part 16 of the retainer 9, alternately U-shaped in opposite directions, does not interfere, during fitting, with the internal boundary of the annular side plate 10 if the outside diameter of the retainer 9 is reduced by taking advantage of the elasticity thereof.

In assembling the one-way clutch thus composed, the sprag 3, retainer 9, annular side plate 10 and garter spring 5 are fitted en bloc between the outer ring 1 and inner ring 2, and then an axial motion stopper 19 (that is, a conventional split lock ring) is fitted to the outer ring 1. The clutch can be disassembled by reversing the above-described procedure.

In addition to the advantages offered by the embodiment of FIGS. 5 and 6, this second embodiment has the following advantages:

As the outer ring 1 and inner ring 2 engage and disengage, some of the sprags 3 move axially to the left and some to the right in FIG. 8, because the sprags 3 are not strictly the same in shape or for other reasons. Then, the sprags 3 moving sideways push the annular side plates 10 on both sides simultaneously. As shown in FIG. 8, however, the circumferentially extending part 16 of the retainer 9 contacts the outside of the annular side plate 10 to keep the side plate 10 resistant against such transverse force, in either direction. Accordingly, even thin annular side plates can well support the thrust load of the moving sprags 3. This permits making a compact one-way clutch, by reducing the axial length thereof, except the length of the sprag, to a minimum. The groove 12 to fit in the garter spring 5 is provided in the middle of the external surface 14 of the sprag 3, which prevents the localized abrasive wear of the side of the sprag 3 and, thereby, lengthens the service life of the clutch.

Figure 20:
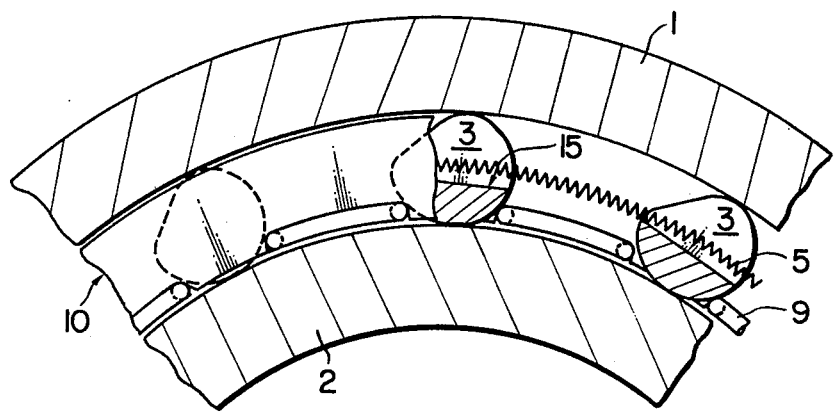
FIG. 20 is a cross-sectional front view showing the principal part of an embodiment in which sprags are inserted at intervals.

Because the axially extending part 17 of the retainer 9 is fitted in the recess 18 of the annular side plate 10, external forces, directed radially outward and circumferentially, which work on the axially extending part 17 of the retainer when the outer and inner rings engage and disengage, are supported by the annular side plates 10. Consequently, the axially extending part 17 of the retainer 9 is prevented from moving in said directions, thereby always keeping the sprag 3, which slidingly contacts the axially extending part 17, in a fixed position. This permits easily designing a one-way clutch best suited for transmitting the desired torque, by spacing the sprags 3 at suitable intervals as shown in FIG. 20. Namely, the number of the sprags can be increased or decreased according to the amount of torque involved by placing the sprag at every second section of the retainer, as shown in FIG. 20, at every third section, and so on.

When fitting the annular side plate 10, the retainer 9 made of steel wire rod permits taking advantage of the elasticity thereof. In addition, many sprags can be inserted en bloc between the outer and inner rings. All this results in easy and rapid assembly and, therefore, in low-priced one-way clutches.

This invention is by no means limited to the above-described embodiments. With reference to FIGS. 5 and 7, for example, the retainer 9, 9' or 9" may be disposed adjacent the inside of the outer ring 1. The sprag 3 may be turned upside down to turn the groove 12 toward the inner ring 2. Further, a compression spring urging outward may be fitted in the groove 12, too. In this case, the embodiment of FIGS. 7 and 8 is modified in such a manner that the recesses 18 are provided along the external boundary of the annular side plate 10.

Two annular garter springs 5 may be used, too. In this case, two parallel grooves 12 must be formed in the sprag 3 to accommodate the two garter springs 5.

Figure 21:
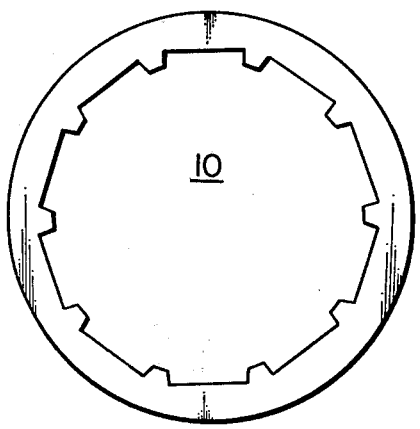
FIGS. 21, 22 and 23 are front views showing other embodiments of the annular side plate.
Figure 22:
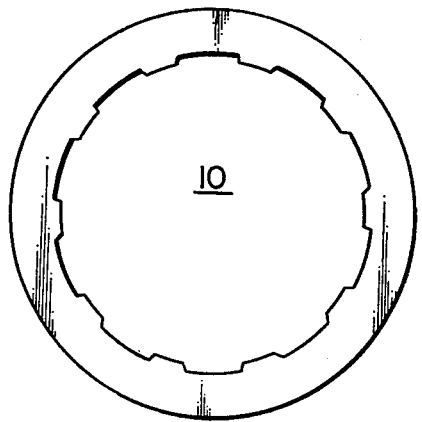
Figure 23:
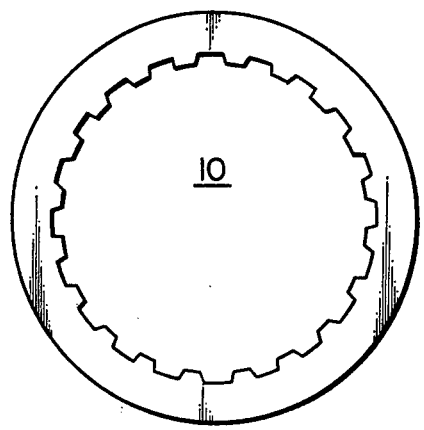
Figure 24:
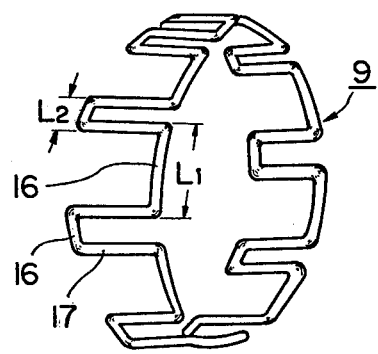
FIG. 24 is a perspective view showing another embodiment of the retainer.

With respect to the embodiment of FIGS. 7 and 8, the annular side plate 10 may be shaped as illustrated in FIGS. 21 to 23. In order to suitably vary the intervals between the sprags 3, the retainer 9 may have circumferentially extending parts 16 of different lengths ($L_1$ and $L_2$) at one end of the axially extending part and the other, as shown in FIG. 24.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a one-way clutch comprising a plurality of sprags annularly inserted between outer and inner rings, comprising the improvement wherein the sprag has a groove formed therein substantially midway between the sides thereof, a garter spring fitted in the groove to urge the sprag toward an engaging direction, an internal surface of the sprag which is shaped so that one of the annularly disposed sprags is continually held in contact with another, an annular retainer comprising a wire rod which is alternately U-shaped to form an axially extending part and a circumferentially extending part to hold the sprag between the axially extending part and the garter spring, and a pair of annular side plates adapted to be inserted between the circumferentially extending part and both sides of the sprag, the annular side plate having a recess in a boundary thereof in which the axially extending part of the retainer fits to prevent the motion thereof.

2. A one-way clutch according to claim 1, wherein the sprag has a substantially cylindrical external surface on one side thereof disposed in bearing engagement with an outer annular surface defined on said inner ring, and wherein the other side of the sprag is formed as an asymmetrical cam surface disposed in engagement with an inner annular surface defined by said outer ring.

* * * * *